Aug. 12, 1924.  
W. G. WAGNER ET AL  
CIGAR CUTTER  
Filed Nov. 8, 1923

1,504,589

INVENTORS  
William G. Wagner  
Henry Cohen  
BY  
Williams & Pritchard  
ATTORNEYS Patented Aug. 12, 1924.

1,504,589

UNITED STATES PATENT OFFICE.

WILLIAM G. WAGNER AND HENRY COHEN, OF NEW YORK, N. Y.

CIGAR CUTTER.

Application filed November 8, 1923. Serial No. 673,400.

*To all whom it may concern:*

Be it known that we, WILLIAM G. WAGNER and HENRY COHEN, citizens of the United States, and residing at borough of Bronx, city of New York, county of Bronx, State of New York, and borough of Manhattan, city and county and State of New York, respectively, have invented certain new and useful Improvements in Cigar Cutters, of which the following is a specification.

This invention relates to cigar cutters and has particular reference to that class of cigar cutters which employ detachable blades.

An important object of our invention is to provide in a device of the above mentioned character a simple and efficient means for retaining in operative position a removable or detachable cutting element.

A further object of the invention is to provide a device of the above mentioned character in which the several co-operating elements thereof are of such construction as to make possible the production of the article at a comparatively low cost, and are of such a nature as to present a neat and attractive appearance when assembled.

Other objects of the invention will become apparent when considering the following specification in connection with the accompanying drawings, in which—

Figure 1:
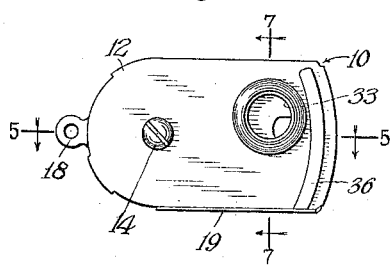
Figure 1 is a face view of the device as viewed from the side thereof through which the cigar tip is introduced.

In the drawings wherein is shown what we at present consider the preferred form of our invention the numeral 10 indicates a housing or casing comprising two relatively movable sections or side members 11 and 12 pivotally connected by means of a transversely disposed bolt 13 passed through the sections relatively near the corresponding ends thereof. This bolt is provided with the usual head 14 and nut 15, the latter being held against rotation with respect to the bolt by means of a pair of lugs 16, which are struck up from the section 11 and cut away at their inner ends to provide V-shaped recesses 17 into which the opposite corners of the hexagonal nut 15 are adapted to fit.

The device embodying our invention being relatively small, light in weight, and thin in cross section is readily adapted to be carried at the end of a watch chain, not shown, and to provide for the connection of such a chain we have formed the section 11 with an eyelet 18.

Figure 2:
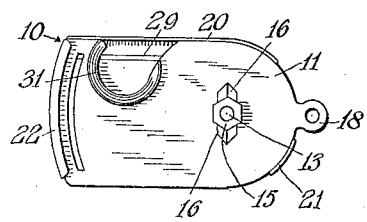
Figure 2 is a view similar to that of Figure 1 showing an obverse side of the device.
Figure 3:
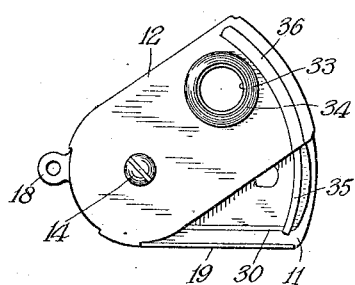
Figure 3 is a view similar to that of Figure 1 showing the movable sections of the device extended.
Figure 4:
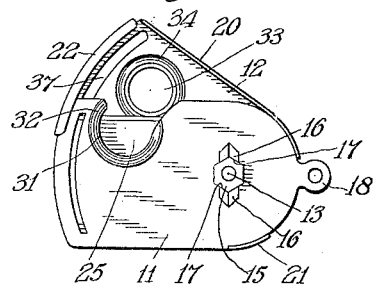
Figure 4 is a view similar to that of Figure 2 showing the movable sections of the device extended.
Figure 5:
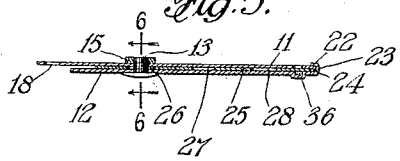
Figure 5 is a longitudinal sectional view taken on line 5—5 of Figure 1.
Figure 6:
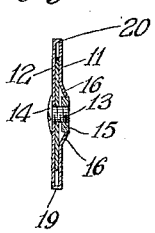
Figure 6 is a transverse sectional view taken on line 6—6 of Figure 5.
Figure 7:
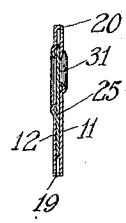
Figure 7 is a transverse sectional view taken on line 7—7 of Figure 1.

In order to guard against the collection of dirt or other foreign matter intermediate the sections 11 and 12, and in order that the device may present a neat and attractive appearance we have provided the section 11 along one longitudinal edge thereof with a flange 19 which is adapted to snugly fit upon the corresponding longitudinal edge of the section 12 when the two sections are positioned as shown in Figures 1 and 2. Upon the opposite longitudinal edge of the section 12 we have provided a similar flange 20 which is adapted to engage the corresponding edge of the section 11 when the device is closed as shown in Figures 1 and 2. These flanges not only lend an attractive and finished appearance to the device and serve to exclude the entrance between the sections 11 and 12 of dirt or other foreign matter which might tend to impede the operation of the device, but such flanges also function as stops against which the sections 11 and 12 abut when moved from their respective positions as shown in Figures 3 and 4 to their closed positions shown in Figures 1 and 2. In order, however, to limit the relative movement of the sections 11 and 12 when they are moved from their respective positions shown in Figures 1 and 2 to their extended positions shown in Figures 3 and 4 we have provided a stop flange 21 carried by the section 12 and adapted to engage the flange 19 carried by the section 11.

Upon one end of the section 12 there is formed a guide flange 22. This guide flange serves to lend a finished appearance to the device and also so functions as to exclude the entrance of dirt or foreign matter between the sections as explained in connection with flanges 19 and 20, but differs from these flanges in that it is bent upon itself as shown at 23 to provide a groove or channel 24 into which the free or movable end of the section 11 is adapted to fit and operate. The flange 22 in addition to functioning as a guide serves as a keeper which tends to prevent the free or movable ends of the sections 11 and 12 from becoming separated or so sprung that the cutting element, indicated by the numeral 25 and hereinafter more particularly referred to, will fail to lie snugly in position upon or against the section 12 in which case the shearing effect of the cutting element upon the cigar tip would, as will be readily appreciated, become more or less impared.

With the device embodying our invention safety razor blades of a well known type are adapted to be used as the cutting element although it will be readily understood that other forms of cutting elements may be employed, if desired. The form of blade herein disclosed is provided with three openings 26, 27 and 28 either 26 or 28 of which is adapted for the reception of the bolt 13 whereas the intermediate opening 27, as will be readily appreciated, performs no function whatsoever in so far as the device embodying our invention is concerned. It will be appreciated that the cutting element 25 may be readily removed from its position intermediate the sections 11 and 12 by removing the bolt 13. Due to the fact that the blade is readily removible it may be easily reversed so that either of the edges 29 or 30 may be employed. Furthermore the cutting element may be turned end for end to enable the user to utilize the cutting edges 29 and 30 substantially throughout their entire lengths. Thus it will be appreciated that each cutting element 25 may be so changed or positioned as to utilize two given portions or lengths of each cutting edge, such changing, however, being necessary only when one given portion has become dull by prolonged use.

The section 11 is cut away to provide an indenture as sown at 31 and is formed with a bead 32 adjacent the indenture, which bead functions as a reinforcing member for the cutting element 25 adjacent that portion of the same which is subjected to cutting strains or stresses incident to the shearing operation. The section 12 is provided with an opening 33 through which the cigar tip, not shown, is adapted to be projected so that the same will overlie the cutting element 25. Around the opening 33 there is formed an annular bead 34 which is struck up from the section 12 and functions as a means for reinforcing the section 12 adjacent the opening 33 against strains and stresses incident to the cutting operation As will be appreciated the bolt 13, adapted to be passed through either of the openings 26 or 28, functions to retain the cutting element 25 at one end against lateral movement with respect to the section 11. The opposite end of the cutting element, however, is locked against lateral movement with respect to the section 11 by means of an arcuate shaped strip or keeper 35 struck up from the section 11 about the pivotal connections between the two sections 11 and 12 as a center. This strip or keeper is of sufficient length to provide a snug fit for the end of the cutting element 25 and allows a sufficient clearance to accommodate the thickness of the cutting element 25. Not only does the strip or keeper effectively retain the blade but it is of such a nature to permit the blade to be readily inserted or withdrawn when it becomes necessary to renew the cutting element or change the same so that new portions of the cutting edges 29 and 30 may be presented at the indenture 31.

It will be noted that the section 12 is provided with an arcuate shaped bead 36 which is struck up from the section 12 about the pivotal connection between the two sections 11 and 12 as a center to form a groove 37 within which the keeper 35 is adapted to fit and operate. The groove so formed not only accommodates the keeper 35 but cooperates with the same more or less as a guide for the movable ends of the sections 11 and 12 when opening and closing the device.

Having thus described our invention, we claim:

1. A cigar cutter comprising a pair of relatively movable pivotally connected side members one of said side members being provided with a keeper and a cutting element disposed intermediate said side members, one end of said cutting element being held in position by said keeper.

2. A cigar cutter comprising a pair of pivotally connected relatively movable side members, a cutting element arranged intermediate said side members and a keeper carried by one of said side members and bridging one end of said cutting element.

3. A cigar cutter comprising a pair of pivotally connected relatively movable side members one of which is provided with a groove and the other of which is provided with a keeper adapted to fit into and operate within said groove, and a cutting element arranged intermediate said side members, one end of said cutting element being disposed beneath and retained in position by said keeper.

4. A cigar cutter comprising a pair of relatively movable pivotally connected side members one of which is provided with an arcuate shaped bead struck therefrom to form an arcuate shaped groove and the other of which is struck out to provide an arcuate shaped keeper in the form of a strip adapted to fit into and operate within said groove and a cutting element disposed intermediate said side members, one end of said cutting element being fixed with respect to the side member from which said keeper is struck and the other end of said cutting element being retained intermediate said keeper and the side member from which said keeper is struck.

5. A cigar cutter comprising a pair of relatively movable pivotally connected side members, a cutting element disposed intermediate said side members and carried by one of said side members and means carried by one of said side members and embracing said cutting element for retaining the same against lateral movement with respect to the side member carrying said cutting element.

6. A cigar cutter comprising a pair of relatively movable pivotally connected side members, a cutting element disposed intermediate said side members and carried by one of said side members and means carried by one of said side members and embracing said cutting element for retaining the same against lateral movement with respect to the side member carrying said cutting element, said means being in the form of a keeper struck up from the side member carrying said cutting element.

7. A cigar cutter comprising a pair of relatively movable pivotally connected side members, a cutting element disposed intermediate said side members and carried by one of said side members, means carried by one of said side members and embracing said cutting element for retaining the same against lateral movement with respect to the side member carrying said cutting element, said means being in the form of a keeper struck up from the side member carrying said cutting element and means carried by the other of said side members and adapted to co-operate with said keeper as a guide for the movable ends of said side members.

In testimony whereof, we have affixed our signatures to this specification.

WILLIAM G. WAGNER.
HENRY COHEN.